(12) United States Patent
Kim et al.

(10) Patent No.: US 12,040,684 B2
(45) Date of Patent: Jul. 16, 2024

(54) ACTUATOR FOR GENERATING VIBRATION

(71) Applicant: JAHWA electronics Co., Ltd., Cheongju-si (KR)

(72) Inventors: Hyo Jun Kim, Cheongju-si (KR); Soon Koo Shim, Cheongju-si (KR); Jong Soo Ryu, Cheongju-si (KR); Hyun Gyu Sung, Cheongju-si (KR); Jung Hoon Jang, Cheongju-si (KR); Jun Ki Lee, Bucheon-si (KR)

(73) Assignee: JAHWA electronics Co., Ltd., Cheongju-si (KR)

( * ) Notice: Subject to any disclaimer, the term of this patent is extended or adjusted under 35 U.S.C. 154(b) by 281 days.

(21) Appl. No.: 17/783,476

(22) PCT Filed: Feb. 1, 2021

(86) PCT No.: PCT/KR2021/001268
§ 371 (c)(1),
(2) Date: Jun. 8, 2022

(87) PCT Pub. No.: WO2021/215628
PCT Pub. Date: Oct. 28, 2021

(65) Prior Publication Data
US 2023/0017545 A1    Jan. 19, 2023

(30) Foreign Application Priority Data
Apr. 22, 2020  (KR) .......................... 10-2020-0048558

(51) Int. Cl.
*H02K 7/06*      (2006.01)
*H02K 3/26*      (2006.01)
(Continued)

(52) U.S. Cl.
CPC ............... *H02K 7/063* (2013.01); *H02K 3/26* (2013.01); *H02K 5/1732* (2013.01); *H02K 7/083* (2013.01);
(Continued)

(58) Field of Classification Search
CPC .......... H02K 7/06; H02K 7/061; H02K 7/063; H02K 5/1677; B06B 1/045; B06B 1/16
See application file for complete search history.

(56) References Cited

U.S. PATENT DOCUMENTS 8,115,354 B2 *  2/2012  An ........................ H02K 7/063
                                                                310/91
2001/0013730 A1   8/2001  Yamaguchi
(Continued)

FOREIGN PATENT DOCUMENTS

CN      205657571 U   10/2016
JP      2013-103142 A  5/2013
(Continued)

OTHER PUBLICATIONS

International Search Report mailed May 10, 2021, in corresponding to International Application No. PCT/ KR2021/001268; 5 pages (with English Translation).

*Primary Examiner* — Gary A Nash
(74) *Attorney, Agent, or Firm* — NKL Law; Byungwoong Park

(57) ABSTRACT

An actuator for generating vibration, including a shaft; a middle supporter having a fitting portion fitted into an upper portion of the shaft and a support portion below the fitting portion to form a first space where a lower portion of the shaft is exposed; a circuit board having a driving coil and a hollow formed through the middle supporter; a housing having an inner space that accommodates the middle supporter and the circuit board so the circuit board is fixed thereto; a first yoke plate having a first magnet installed to (Continued)

face an upper surface of the driving coil and coupled to an upper portion of the middle supporter; a second yoke plate having a second magnet installed to face a lower surface of the driving coil and coupled to a lower portion of the middle supporter; and a weight installed to at least one of the yoke plates.

8 Claims, 10 Drawing Sheets

(51) Int. Cl.
    *H02K 5/167*     (2006.01)
    *H02K 5/173*     (2006.01)
    *H02K 7/08*     (2006.01)

(52) U.S. Cl.
    CPC ....... *H02K 5/1677* (2013.01); *H02K 2203/03* (2013.01)

(56) References Cited

U.S. PATENT DOCUMENTS

| | | | |
|---|---|---|---|
| 2011/0001385 A1* | 1/2011 | Saito | H02K 7/063 310/214 |
| 2015/0236563 A1* | 8/2015 | Yamaguchi | H02K 7/063 310/81 |
| 2019/0103796 A1* | 4/2019 | Shim | H02K 33/04 |
| 2019/0312483 A1* | 10/2019 | Lee | H02K 7/063 |

FOREIGN PATENT DOCUMENTS

| | | |
|---|---|---|
| KR | 10-0726243 B1 | 6/2007 |
| KR | 10-2007-0075747 A | 7/2007 |
| KR | 10-1097615 B1 | 12/2011 |
| KR | 10-2144680 B1 | 8/2020 |

* cited by examiner

ACTUATOR FOR GENERATING VIBRATION

FIELD

The present disclosure relates to an actuator for generating vibration, and more specifically, to an actuator for generating vibration, which is optimized for an installation environment of a target through structural improvement for vibration generation and physical support of rotational movement.

BACKGROUND

In a mobile terminal such as a smart phone, a vibration function (or, haptic function) is implemented not only for interfacing of call incoming but also for feedback interfacing of information input, event occurrence and application execution to a user.

A vibration device that implements such a vibration function is a device that converts energy obtained by an electromagnetic action into mechanical vibration energy, and various driving methods are applied thereto according to a power application and a moving type of a vibrator.

Meanwhile, in recent years, there is disclosed a device with a massage function, which may make interfacing (alerting, alarming, etc.) for various information in a vehicle or the like, other than a mobile terminal possessed or carried by a user, and is embedded in a driver seat to relieve fatigue by transmitting vibration energy to the body of a driver.

A vibration device applied to a mobile terminal or the like has a very small size due to the characteristics of the mobile terminal, and is designed to have fast response characteristics according to interfacing. In addition, such a vibration device is generally in direct contact with the body of the user or in a similar way, and further, it is generally designed not to have a large vibration force for the overall power efficiency of the mobile terminal.

Meanwhile, a vibration device installed to a seat or the like of a vehicle must be basically used continuously for a long time. Also, since the inside of the vehicle has a large temperature change and external shocks or vibrations occur frequently and continuously, the vibration device for a vehicle must have sufficient durability against such external environments.

In addition, the vibration device for a vehicle must transmit the vibration force to well to a person on the seat regardless of the load of the person or the depth of the vibration device installed inside the seat, so it must be designed to generate an optimized vibration force.

However, even though the size of the vibration device applied to a mobile terminal is simply increased, the vibration device does not have sufficient durability due to its intrinsic structural characteristics, and it is difficult to generate a sufficient vibration force inside the seat or cushion member. Also, this vibration device does not meet the quiet environment due to high-frequency noise generation caused by rapid rotation.

In addition, in the case where an eccentric vibrating weight is forcibly inserted into a general electric motor and then driven, it is difficult to install this product at the seat or cushion member of the vehicle because the product has an excessively large thickness. Moreover, even though this product is installed, when the seat or the like is pressed by the load of a person, the physical heterogeneous sense of the hard electric motor is transmitted to the person on the seat, thereby extremely deteriorating the user convenience.

In addition, if the sheet is thickened and the electric motor is installed deep inside the sheet in order to eliminate such physical heterogeneous sense, the transmission of the vibration force is lowered as much, thereby deteriorating the overall driving efficiency.

SUMMARY

The present disclosure is designed to solve the problems of the related art, and therefore the present disclosure is directed to providing an actuator for generating vibration, which is optimized for an installation environment such as a vehicle by further improving the durability against continuous use for a long time and effectively generating a sufficient vibration force.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

In one aspect of the present disclosure, there is provided an actuator for generating vibration, comprising: a shaft; a middle supporter having a fitting portion fitted into an upper portion of the shaft and a support portion provided below the fitting portion to form a first space in which a lower portion of the shaft is exposed; a circuit board having a driving coil and a hollow formed through the middle supporter; a housing having an inner space formed to accommodate the middle supporter and the circuit board so that the circuit board is fixed thereto; a first yoke plate having a first magnet installed to face an upper surface of the driving coil and fixedly coupled to an upper portion of the middle supporter; a second yoke plate having a second magnet installed to face a lower surface of the driving coil and fixedly coupled to a lower portion of the middle supporter; and a weight installed to at least one of the first and second yoke plates.

Preferably, the present disclosure may further comprise a second bearing assembly provided in the first space to physically support the lower portion of the shaft exposed in the first space, and also the present disclosure may further comprise a first bearing assembly configured to physically support an outer circumference of the fitting portion.

In this case, an inner diameter of the first space according to the present disclosure may be greater than an outer diameter of the fitting portion.

Specifically, the first bearing assembly of the present disclosure may include a first body configured to face the outer circumference of the fitting portion; and a first ball provided to the first body and configured to contact the outer circumference of the fitting portion, and the second bearing assembly of the present disclosure may include a second body configured to face the lower portion of the shaft; and a second ball provided to the second body and configured to contact the lower portion of the shaft.

Here, a position at which the first ball according to the present disclosure guides and supports rotational movement of the fitting portion may be relatively outer and relatively upper than a position at which the second ball guides and supports rotational movement of the lower portion of the shaft.

In addition, the first ball may be configured to have a greater diameter than the second ball.

Further, the housing of the present disclosure may include an upper housing having a first placing portion provided at an inner upper surface thereof so that the first bearing assembly is coupled thereto; a sub case having a second placing portion formed at a bottom surface thereof so that the second ball bearing assembly is provided thereto and the first space is coupled thereto, the sub case having at least one coupling portion that is coupled to the circuit board; and a lower housing having a coupling space to which the sub case is coupled, the lower housing being coupled with the upper housing.

According to a preferred embodiment of the present disclosure, the magnetic force generated in the driving coil may be converted into a rotational driving force at both upper and lower parts of the driving coil by dually arranging the magnets generating a rotational driving force at the upper and lower portions of the driving coil, thereby further enhancing the vibration force by rotational drive.

According to another preferred embodiment of the present disclosure, since the bearing structure dualizes the object that supports and guides the rotational movement, and the supporting and guiding positions are also differentiated from each other based on upper and lower directions or inner or outer directions, it is possible to more effectively suppress twist, tilt, slip, deviation, or the like, thereby providing more robust durability against continuous use for a long time and also further improving the service life.

According to still another preferred embodiment of the present disclosure, since the size of the ball applied to the bearing structure is designed differently depending on the object physically supported by the ball, it is possible to minimize damage or consumption caused by physical friction between different materials, thereby further improving the driving performance and durability.

BRIEF DESCRIPTION OF THE DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION OF THE EMBODIMENTS

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
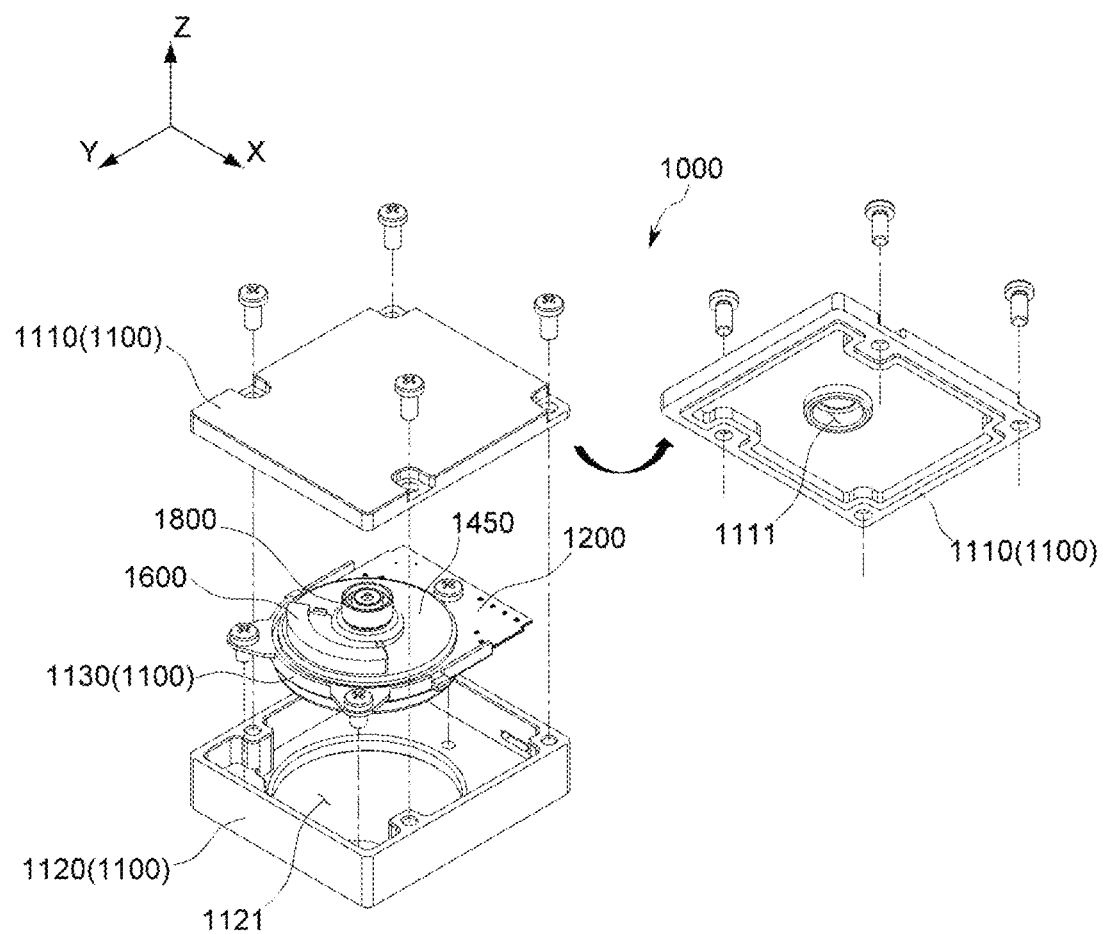
FIG. 1 is a diagram showing an overall configuration of an actuator for generating vibration according to a preferred embodiment of the present disclosure.
Figure 2:
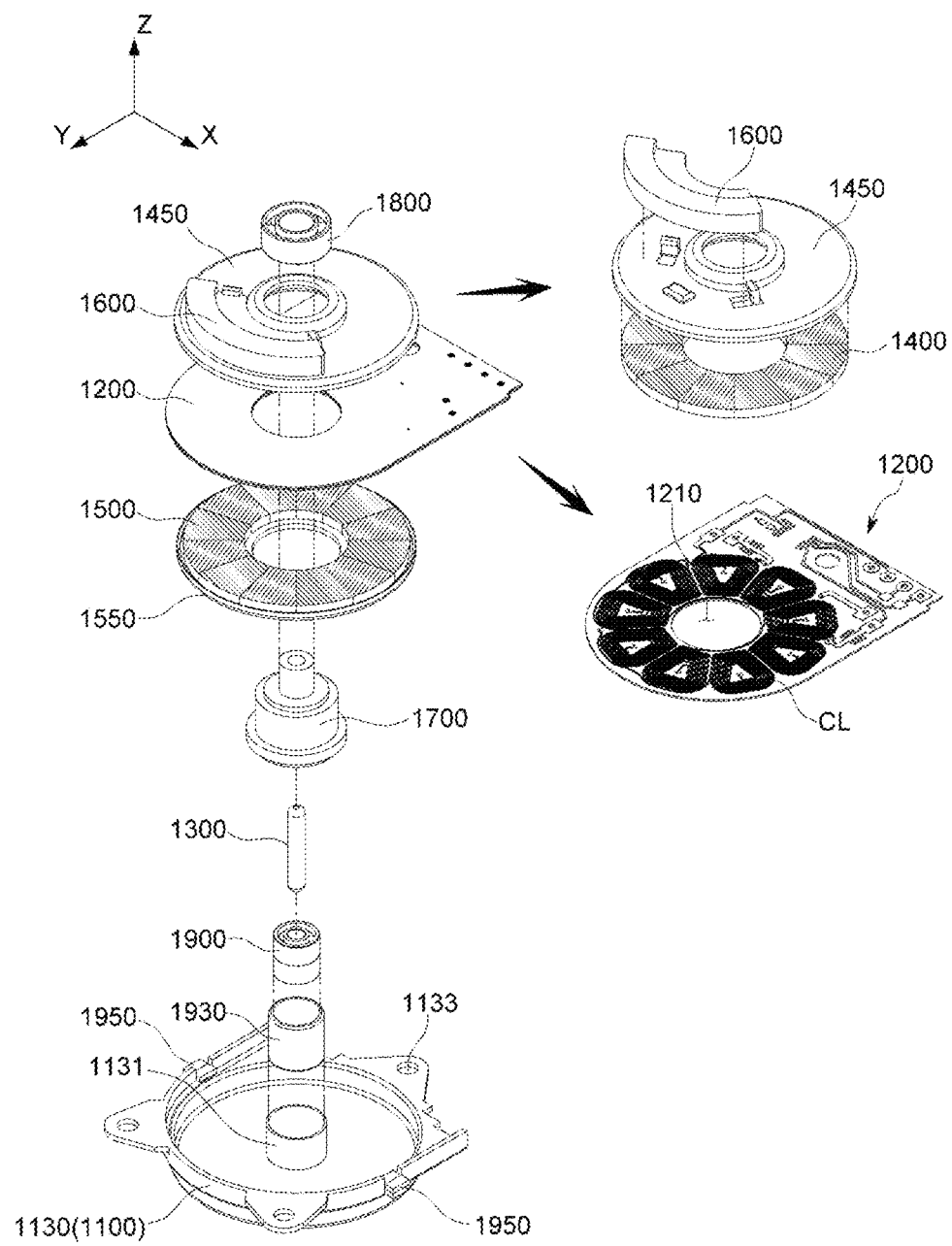
FIG. 2 is an exploded view showing a detailed configuration of the actuator for generating vibration as depicted in FIG. 1.

FIG. 1 is a diagram showing an overall configuration of an actuator 1000 for generating vibration (hereinafter, referred as an 'actuator') according to a preferred embodiment of the present disclosure, and FIG. 2 is an exploded view showing a detailed configuration of the actuator 1000 depicted in FIG. 1.

The actuator 1000 of the present disclosure corresponds to an actuator with a massage function, which is inserted into a chair, a seat, a backrest, a cushion member or the like provided in a vehicle to make interfacing for various information related to the vehicle and/or spread a generated vibration force to relieve fatigue of a person seating thereon.

The actuator 1000 of the present disclosure may be applied not only to a seat for a vehicle but also to furniture or devices that enhance user convenience such as a chair, a bed and a sofa.

The actuator 1000 of the present disclosure may be configured to include a housing 1100, a driving coil CL, a circuit board 1200, a shaft 1300, a middle supporter 1700, a first magnet 1400, a second magnet 1500 and a weight 1600, as shown in FIG. 1.

The housing 1100 of the present disclosure has an inner space in which components of the present disclosure are provided, and functions as a stator that supports rotational movement for generating vibration, as described later.

Since the actuator 1000 of the present disclosure may be inserted into and installed to the seat for a vehicle, the overall shape of the actuator 1000 including the housing 1100 is preferably implemented in a thin type having a low height (the Z-axis direction) and an appropriate width in a planar direction (the XY planar direction) perpendicular to the height direction as shown in FIG. 1.

The axes shown in the drawings, terms referring to the axes, and terms such as "upper" or "lower" based on the corresponding axes are only for presenting a relative criterion for describing an embodiment of the present disclosure, and it is obvious that the terms are not intended to specify any direction, any position, or the like.

The housing 1100 of the present disclosure may be dualized into an upper housing 1110 and a lower housing 1120 according to an embodiment. In addition, in order to further increase the efficiency of the assembly process, the housing 1100 of the present disclosure is equipped with components for generating vibration and may additionally include a sub case 1130 that is placed in and coupled to a coupling space 1121 of the lower housing 1120.

The circuit board 1200 of the present disclosure has a hollow 1210 formed in a center portion as shown in FIG. 2, and the driving coil CL is mounted on a surface between the hollow 1210 and an outer circumference of the circuit board 1200.

The circuit board 1200 may be fixed to a coupling portion 1133 provided to the sub case 1130 by means of screw fastening or the like, as illustrated in FIGS. 1 and 2.

The first magnet 1400 facing an upper surface of the driving coil CL is located at an upper portion (based on the Z-axis direction) of the circuit board 1200, and the second magnet 1500 facing a lower surface of the driving coil CL is located at a lower portion thereof.

If a power of appropriate size and direction is applied to the driving coil CL, a magnetic force is generated at the upper and lower portions of the driving coil CL at the same time, and the generated magnetic force is simultaneously transmitted to the first magnet 1400 and the second magnet 1500, respectively, so that the first magnet 1400 and the second magnet 1500 rotate with an increased driving force.

Specifically, the first magnet 1400 is installed to a first yoke plate 1450 that supports the first magnet 1400 and is fixedly coupled to an upper portion of the middle supporter 1700, explained later. In addition, the second magnet 1500 is installed to a second yoke plate 1550 that supports the second magnet 1500 and is fixedly coupled to a lower portion of the middle supporter 1700.

The first and second yoke plates 1450, 1550 may be made of metal or the like, and functions to physically support the first magnet 1400 and the second magnet 1500, respectively, and at the same time prevent the magnetic force generated from the driving coil CL from leaking to the outside but allow the magnetic force to be concentrated on the first magnet 1400 and the second magnet 1500, respectively.

In order to implement the above function more effectively, it is preferable to configure the first yoke plate 1450 to have a disk shape whose outer circumferential portion descends downward, and the first magnet 1400 is preferably configured to be coupled to the lower portion of the first yoke plate 1450. If configured in this way, it is also possible to effectively prevent the first magnet 1400 from being separated by a centrifugal force caused by rotational movement.

In a corresponding point of view, the second magnet 1500 is preferably configured to be coupled to the upper portion of the second yoke plate 1550.

The shaft 1300 of the present disclosure functions as a reference axis for rotational movement and is installed through the hollow 1210 formed in the center portion of the circuit board 1200. Also, an upper portion of the shaft 1300 is fitted into an upper portion of the middle supporter 1700 according to the present disclosure.

The middle supporter 1700 of the present disclosure is a rotating object. As described above, the first yoke plate 1450 is coupled and fixed to the upper portion of the middle supporter 1700, and the second yoke plate 1550 is coupled and fixed to the lower portion of the middle supporter 1700.

That is, since both the first and second yoke plates 1450, 1550 are fixedly coupled to the middle supporter 1700 with a gap H (see FIG. 5) to be spaced apart from each other in the height direction, if a magnetic force is generated by the driving coil CL, the middle supporter 1700, the first yoke plate 1450 and the second yoke plate 1550 rotate together.

Meanwhile, since the circuit board 1200 equipped with the driving coil CL is fixedly coupled to the housing 1100, the circuit board 1200 functions as a stator together with the housing 1100.

The weight 1600 of the present disclosure is installed to at least one of the first yoke plate 1450 and the second yoke plate 1550, and if the first yoke plate 1450 equipped with the weight 1600 is rotated, vibration is generated due to the weight eccentricity.

As shown in FIG. 2, a stepped structure, a fitting structure, or the like may be provided on an upper surface of the first yoke plate 1450 to prevent the weight 1600 from being separated to the outside.

A position magnet 1950 shown in FIG. 2 is a component for generating an attractive force or repulsive force with the first magnet 1400 or/and the second magnet 1500 through magnetic pole arrangement, and corresponds to a configuration for guiding the first magnet 1400 or/and the second magnet 1500 to stop at a correct position.

Figure 3:
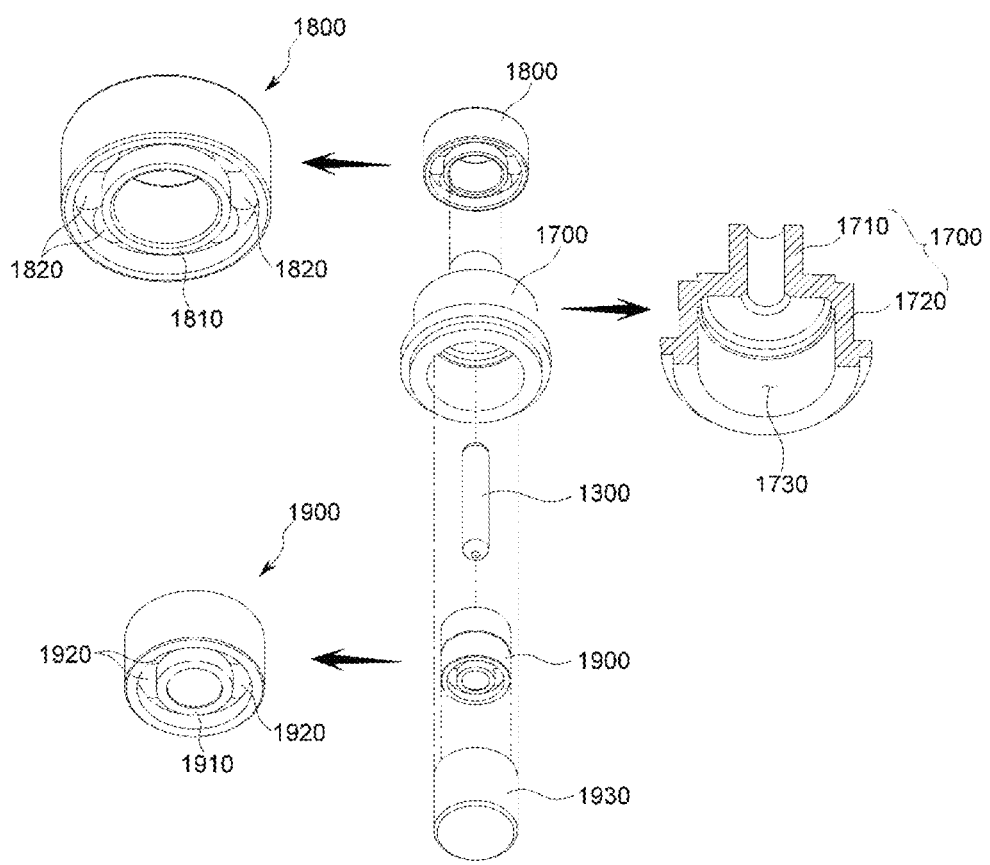
FIG. 3 is a diagram showing components for rotational movement of the present disclosure and mutual coupling relationship thereof.

FIG. 3 is a diagram showing components for rotational movement of the present disclosure and mutual coupling relationship thereof.

As shown in FIG. 3, the middle supporter 1700 of the present disclosure may be specifically configured to include a fitting portion 1710 and a support portion 1720. As mentioned above, the upper portion of the shaft 1300 is coupled to the fitting portion 1710 of the middle supporter 1700.

Depending on the embodiment, the upper portion of the shaft 1300 may not be fixed to the fitting portion 1710 but be configured to guide the rotational movement of the middle supporter 1700. However, if the upper portion of the shaft 1300 is fixedly coupled to the fitting portion 1710 of the middle supporter 1700 so that the middle supporter 1700 rotates, it is desirable that the shaft 1300 is configured to rotate together.

In this configuration, it is possible to guide the overall rotational movement of the middle supporter 1700 to be performed more accurately at the correct position, and further, the rotational movement of the middle supporter 1700 may be supported more firmly.

The support portion 1720 of the middle supporter 1700 is provided below the fitting portion 1710, and as shown in FIG. 3, a first space 1730 is formed therein so that the lower portion of the shaft 1300 coupled to the fitting portion 1710 is exposed therein.

A second bearing assembly 1900 of the present disclosure is a component that is coupled to the first space 1730, and corresponds to a configuration that guides and supports the lower portion of the shaft 1300 exposed through the first space 1730 by means of a bearing structure.

Specifically, the second bearing assembly 1900 may be configured to include a second body 1910 configured to face the lower portion of the shaft 1300 and a second ball 1920 provided to the second body 1910 to contact the lower portion of the shaft 1300, as shown at the bottom of the enlarged view of FIG. 3.

In order to physically support the lower portion of the shaft 1300 and guide rotational movement thereof more effectively, the second bearing assembly 1900 may be provided in plural at upper and lower parts according to the length of the shaft 1300 as illustrated in FIG. 3.

The second bearing assembly 1900 is formed on a bottom surface of the sub case 1130 and may be provided to a second placing portion 1131 (see FIG. 2) coupled to the first space 1730.

In addition, as shown in FIGS. 2 and 3, the second bearing assembly 1900 of the present disclosure is preferably configured to be located in the second placing portion 1131 and the first space 1730 by means of the guiding member 1930 so as to improve the efficiency of the assembly process or the like in which fitting is performed and to further suppress the gap between physically facing components.

Meanwhile, the first bearing assembly 1800 of the present disclosure is a configuration for guiding and supporting an outer circumference of the fitting portion 1710, which corresponds to the upper portion of the middle supporter 1700, by a bearing structure as shown in FIG. 3.

As shown at the top of the enlarged view of FIG. 3, specifically, the first bearing assembly 1800 of the present disclosure may include a first body 1810 configured to face the outer circumference of the fitting portion 1710 and a first ball 1820 provided to the first body 1810 to contact the outer circumference of the fitting portion 1710, and may be configured to be coupled to the housing 1100, specifically a first placing portion 1111 provided at an inner upper surface of the upper housing 1110.

Through this structure, the first bearing assembly 1800 is coupled to the first placing portion 1111 of the upper housing 1110, and the second bearing assembly 1900 is coupled to the second placing portion 1131 of the sub case 1130 of the housing 1100, so that the first and second bearing assemblies 1800, 1900 may function as a stator in the aspect corresponding to a rotator, performed by the middle supporter 1700 or the like, together with the housing 1100.

Figure 4:
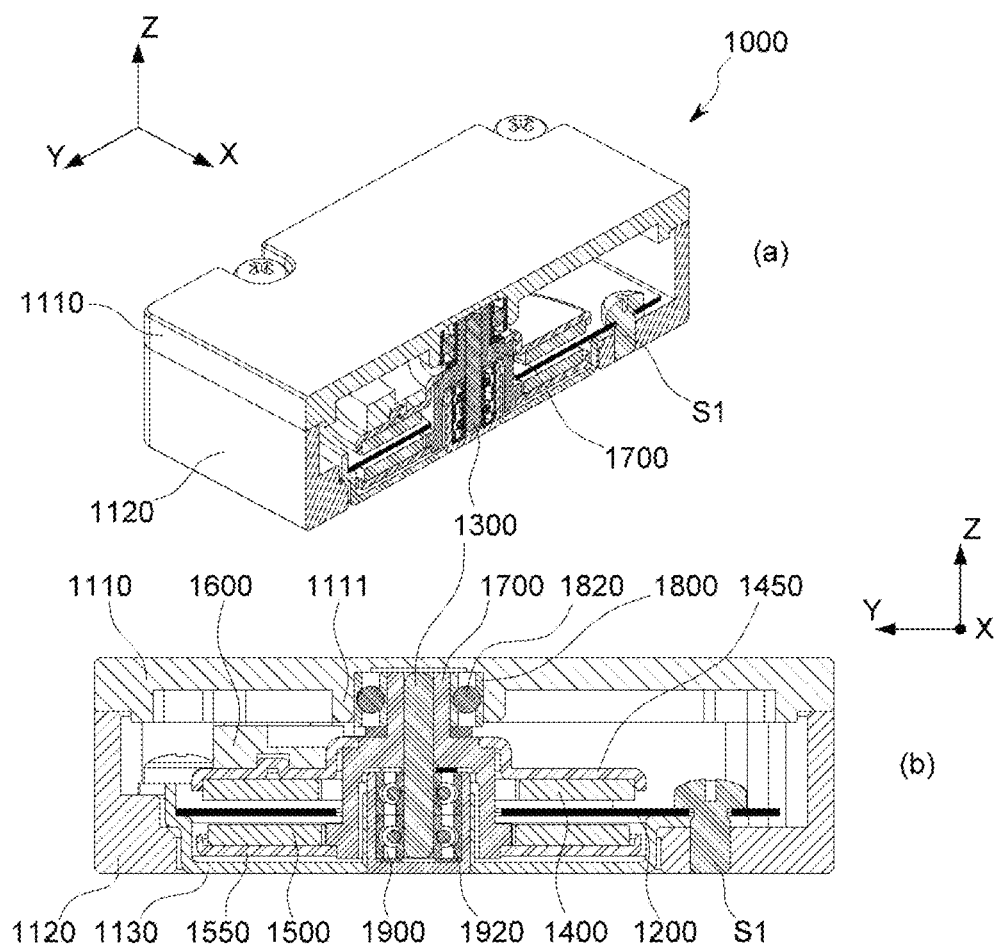
FIG. 4 is a sectional perspective view and a sectional view showing an inner structure of the actuator for generating vibration according to the present disclosure.
Figure 5:
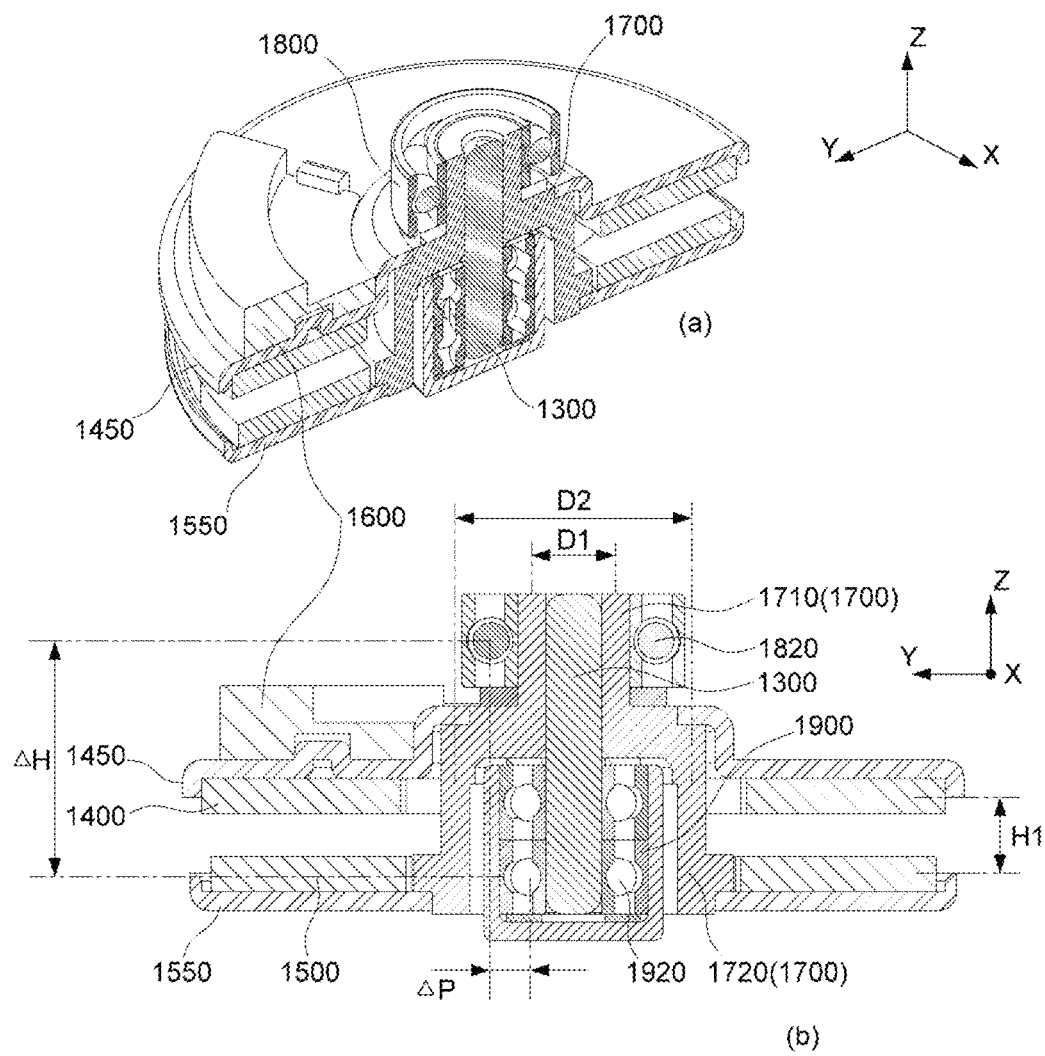
FIG. 5 is a sectional perspective view and a sectional view showing a detailed configuration of the present disclosure associated with rotational movement.

FIG. 4 is a sectional perspective view (FIG. 4(a)) and a sectional view (FIG. 4(b)) showing an inner structure of the actuator 1000 according to the present disclosure, and FIG. 5 is a sectional perspective view (FIG. 5(a)) and a sectional view (FIG. 5(b)) showing a detailed configuration of the present disclosure associated with rotational movement.

As described above, among the components of the actuator 1000 of the present disclosure, the upper housing 1110, the lower housing 1120, the sub case 1130 coupled to the lower housing 1120, the first bearing assembly 1800 coupled to the upper housing 1110, and the second bearing assembly 1900 coupled not the sub case 1130 corresponds to stators.

Since the circuit board 1200 is fixedly coupled to the sub case 1130 by a fastening means S1 or the like as described above, the circuit board 1200 also corresponds to a stator.

The circuit board 1200 is preferably implemented as a flexible circuit board (FPCB) having flexibility rather than a hard circuit board (Hard PCB) so that shock or vibration may be absorbed or dispersed.

The middle supporter 1700 and the shaft 1300 fixedly coupled to the middle supporter 1700 are main components that constitute a rotator, and correspond to an object that rotationally moves at a fixed position.

In addition, the first and second magnets 1400, 1500 of the present disclosure are installed at the first yoke plate 1450 and the second yoke plate 1550, respectively, with a gap H1 to be spaced apart from each other in the vertical direction (the Z-axis direction) as shown in FIG. 5, thereby configuring a rotator that rotates together with the middle supporter 1700.

The actuator 1000 according to the present disclosure is configured to physically support a component that axially rotates by means of the first bearing assembly 1800 and the second bearing assembly 1900 in a dualized configuration and guide the rotational movement of the component.

As described above and as shown in FIGS. 4 and 5, a target that is supported and guided by the first bearing assembly 1800 of the present disclosure is the middle supporter 1700, specifically the fitting portion 1710 of the middle supporter 1700, and a target that is supported and guided by the second bearing assembly 1900 is the shaft 1300.

That is, in the actuator 1000 according to the present disclosure, each bearing structure is configured to physically support and guide different targets.

Since the configuration for supporting and guiding the rotational movement is dualized and further different targets are supported and guided at different locations by the dualized components, the physical support and guiding of the axially rotating object may be more effectively implemented.

In order to implement this more effectively, it is preferable to configure that an inner diameter D1 of the first space 1730 formed by the support portion 1720 of the middle supporter 1700 is greater than an outer diameter of the fitting portion 1710 of the middle supporter 1700 as shown in FIG. 5.

In this configuration, since the space where the first bearing assembly 1800 and the second bearing assembly 1900 are coupled may be effectively utilized, a position where the first bearing assembly 1800 supports the fitting portion 1710 and a position where the second bearing assembly 1900 supports the lower portion of the shaft 1300 may be more effectively configured differently without significantly changing the overall volume of the device.

In addition, in this configuration, the space in which the first bearing assembly 1800 is placed may be relatively expanded, so that the first ball 1820 having a relatively large size compared to the second ball 1920 in contact with the shaft 1300 may be applied to the first bearing assembly 1800.

The balls 1820, 1920, the shaft 1300 and the like may be made of materials with high rigidity such as metal and ceramic, but members such as the middle supporter 1700 having non-simple geometric features are generally made of plastic material that is molded by injection.

As described above, according to the present disclosure, since the first ball 1820 of a relatively large size may be applied, it is possible to further minimize physical damage that may be caused by the contact between the first ball 1820 and the middle supporter 1700, which may be made of different materials.

In addition, if the actuator 1000 of the present disclosure is used, the position at which the first ball 1820 of the first bearing assembly 1800 guides and supports the rotational movement of the fitting portion 1710 is relatively outer (ΔP) than the position at which the second ball 1920 guides and supports the rotational movement of the lower portion of the shaft 1300, and further is relatively upper (ΔH).

Since the positions for guiding and supporting the rotational movement are configured to be different from each other in an upper and lower direction and in an inner and outer direction and also the guided and supported objects are also dualized, it is possible to guide the physical support for rotational movement to be further dispersed, thereby providing more robust durability in an environment where rotational movement is continuously performed for a long time.

Figure 6:
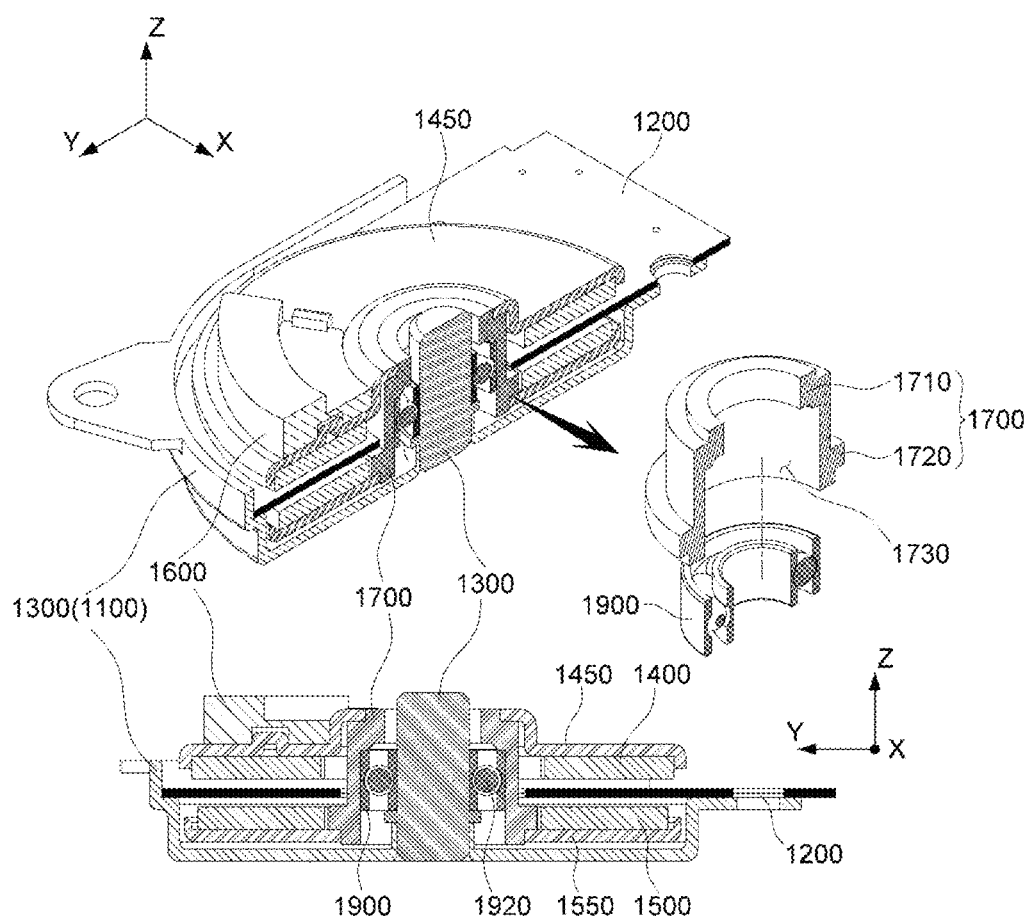
FIG. 6 is a diagram showing a structure of an actuator for generating vibration according to another embodiment of the present disclosure.

FIG. 6 is a diagram showing a structure of an actuator 1000 according to another embodiment of the present disclosure. FIG. 6 corresponds to an embodiment to which a second bearing assembly 1900 according to another embodiment of the present disclosure is applied.

As shown in FIG. 6, the second bearing assembly 1900 of the present disclosure is configured to be inserted into the first space 1730 of the middle supporter 1700 as described above and is configured to guide and support the rotational movement of the middle supporter 1700 inside the first space 1730.

In this case, an outer side of the second ball 1920 contacts an inner surface of the support portion 1720 of the middle supporter 1700 to guide the rotational movement of the middle supporter 1700. In this configuration, since the outer side of the second ball 1920 guides the rotational movement of the middle supporter 1700, a contact position is formed in an area further extended based on the axis center of the shaft 1300, thereby more stably guiding the rotational movement of the middle supporter 1700.

Hereinafter, an embodiment of a detailed configuration and electrical connection relationship of the driving coil CL of the present disclosure that generates a magnetic force at the first magnet 1400 and the second magnet 1500 will be described in detail with reference to the accompanying drawings.

Figure 7:
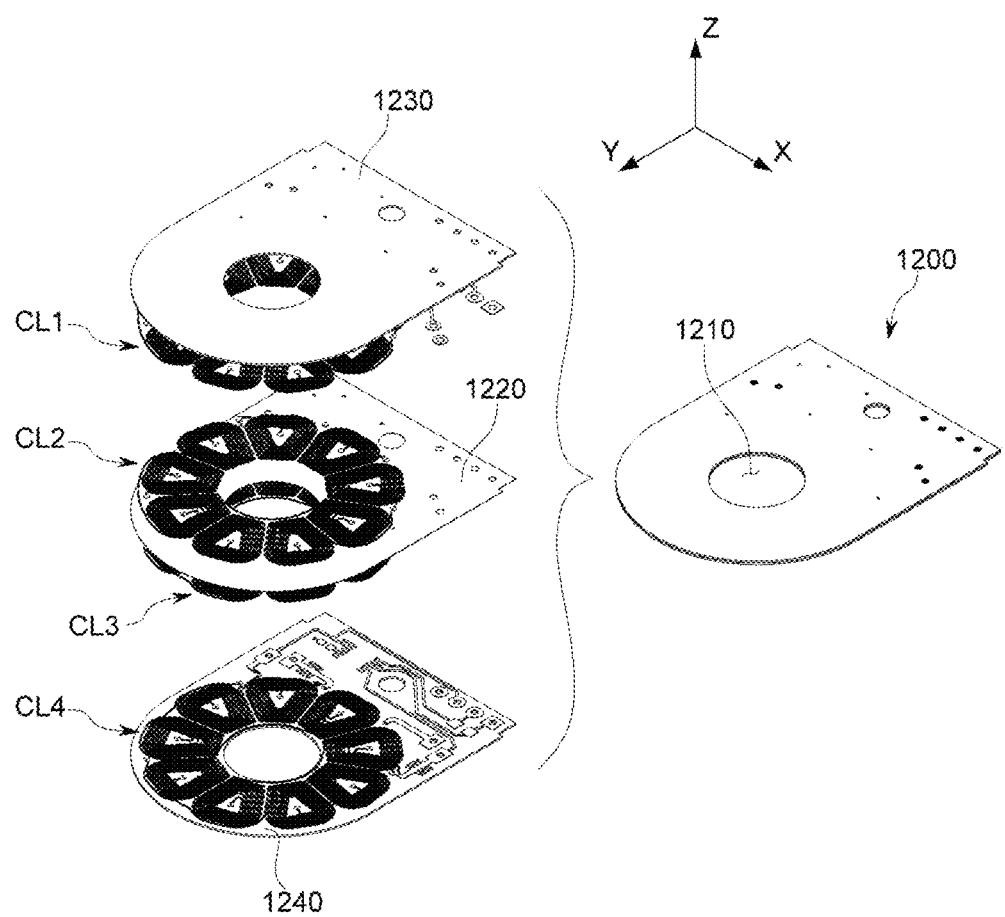
FIG. 7 is an exploded view showing a circuit board and a driving coil according to the present disclosure.
Figure 8:
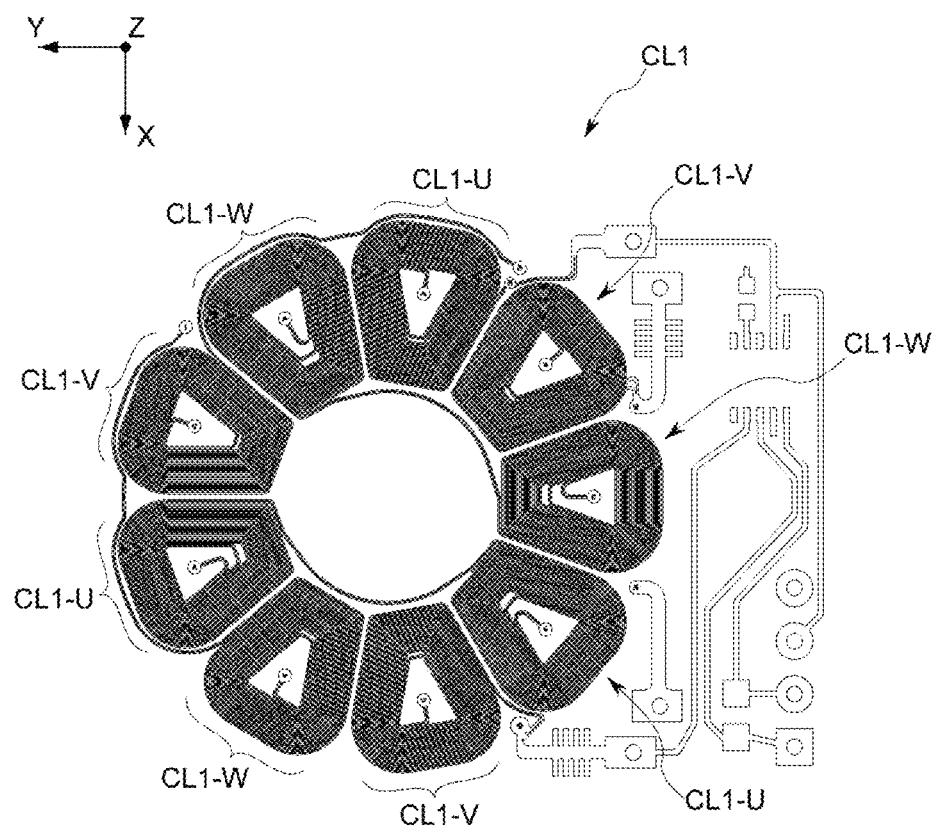
FIG. 8 is a diagram showing a detailed configuration of each coil layer (driving coil)

FIG. 7 is an exploded view showing the circuit board 1200 and the driving coil CL according to the present disclosure, and FIG. 8 is a diagram showing a detailed configuration of each coil layer (driving coil).

As shown in FIG. 7, the driving coil CL of the present disclosure may include a plurality of coil layers stacked up and down in a vertical direction (the Z-axis direction). In the following description, the driving coil CL positioned in each layer will be referred to as a coil layer.

At a center portion of each coil layer CL1, CL2, CL3, CL4, a hollow corresponding to the hollow 1210 of the circuit board 1200 is formed so that the shaft 1300 of the present disclosure may pass therethrough.

Although four coil layers are shown in the drawing, this is only one embodiment, and a different number of coil layers may be applied. However, since the number of stacked coil layers is one of factors that determine the thickness of the actuator 1000 of the present disclosure. Thus, in order to simultaneously improve thickness efficiency and increase magnetic force, the driving coil is preferably implemented as four coil layers as illustrated in the drawing.

The coil layers CL1, CL2, CL3, CL4 may be implemented by PCB patterning or by being attached to a PCB. However, in order to more effectively decrease the insulation gap between the patterns (between coil lines) obtain an optimal height (thickness), the coil layers CL1, CL2, CL3, CL4 are preferably implemented by COF (Chip On Flexible Printed Circuit) packaging.

As shown in FIG. 8, the first coil layer CL1 may have a structure in which a plurality of coil units CL1-U, CL1-V, CL1-W having different phases (U, V, W) are repeatedly and sequentially arranged while forming an annular shape. That is, in the case where the coil units have three different phases (U, V, W), for example, the number of total coil units forming the first coil layer CL1 will be 3n (n is a natural number greater than 1).

In order to effectively implement the annular shape and increase the space integration degree and the density of generated magnetic force, it is desirable that the total number of coil units constituting the first coil layer CL1 is 3k (k is a natural number of 2 or more).

The other coil layers CL2, CL3, CL4 may be partially different from each other only in a structure for applying an external power, and are configured to include a plurality of coil units having different phases, similar to the first coil layer CL1 described above.

Even though an embodiment including 9 coil units in each of the coil layers CL1, CL2, CL3, CL4 is shown in the drawings, this is only an example, and the number of coil units constituting each coil layer CL1, CL2, CL3, CL4 may differ from each other while maintaining a multiple of 3 times, as long as they have positional alignment in the upper and lower direction of the coil unit.

According to an embodiment, the first coil layer CL1 and the fourth coil layer CL4 may be implemented to have 9 coil units as illustrated in the drawing, and the second coil layer CL2 and the third coil layer CL3 may be implemented to have 3 or 6 coil units deflected in a specific direction.

If the structure of the driving coil is configured as above and the first magnet 1400 and the second magnet 1500 are provided only in a partial space rather than the entire space, in a first area where all of four layers have coil units based on the upper and lower direction, a relatively stronger magnetic force is generated compared to a second area where only two layers include coil units. Thus, the rotator including the middle supporter 1700 may be rotated at an uneven speed.

If the rotator rotates at an uneven speed as above, it is possible to generate a synergy effect together with an eccentric rotation of the weight 1600, thereby generating a further enhanced vibration force.

As shown in FIG. 7, the second coil layer CL2 and the third coil layer CL3 are preferably configured to be mounted to an upper surface and a lower surface based on the base core 1220 in order to increase the thickness efficiency.

In addition, according to an embodiment, the first coil layer CL1 may be configured to be mounted to an upper core 1230 and the fourth coil layer CL4 may be configured to be mounted to a lower core 1240.

The upper core 1230 and the lower core 1240 may also perform plane-to-plane guiding for rotational movement of the first magnet 1400 and the second magnet 1500. The drawing just shows the upper core 1230, the lower core 1240 and the base core 1220 as one example for providing the coil layers CL1, CL2, CL3, CL4, but their shapes or positions may be implemented differently.

Figure 9:
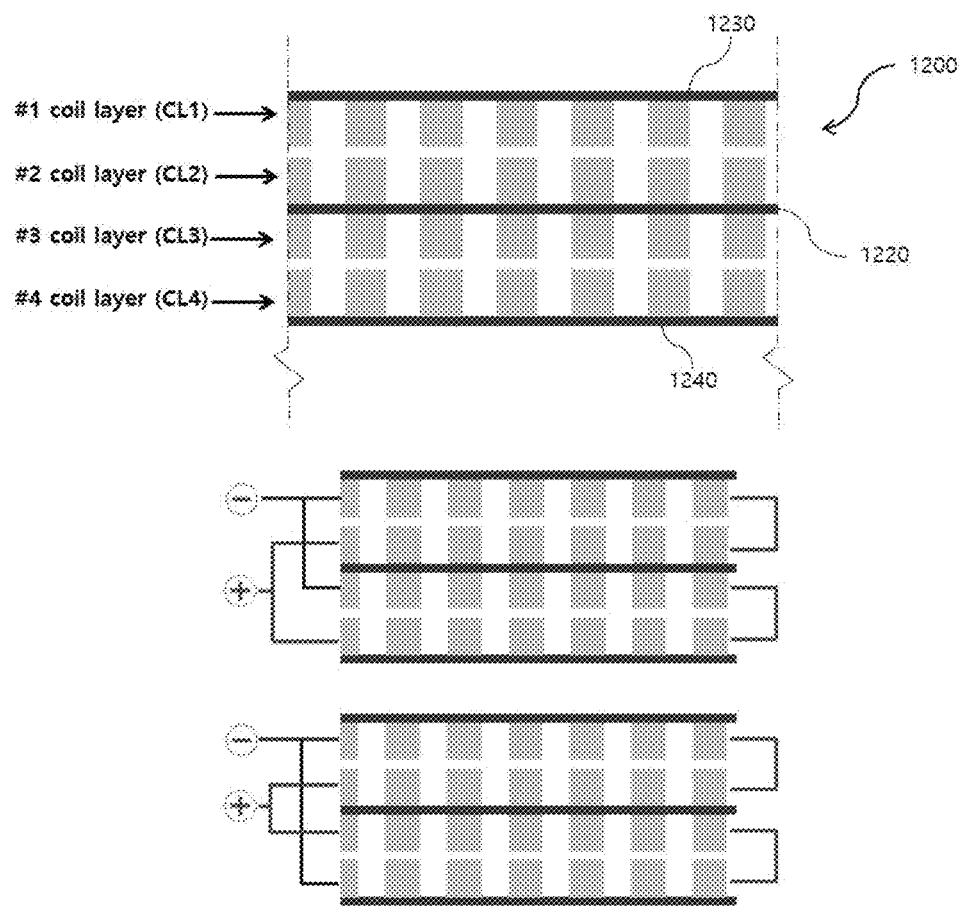
FIG. 9 is a diagram showing a structure of a plurality of coil layers according to the present disclosure.
Figure 10:
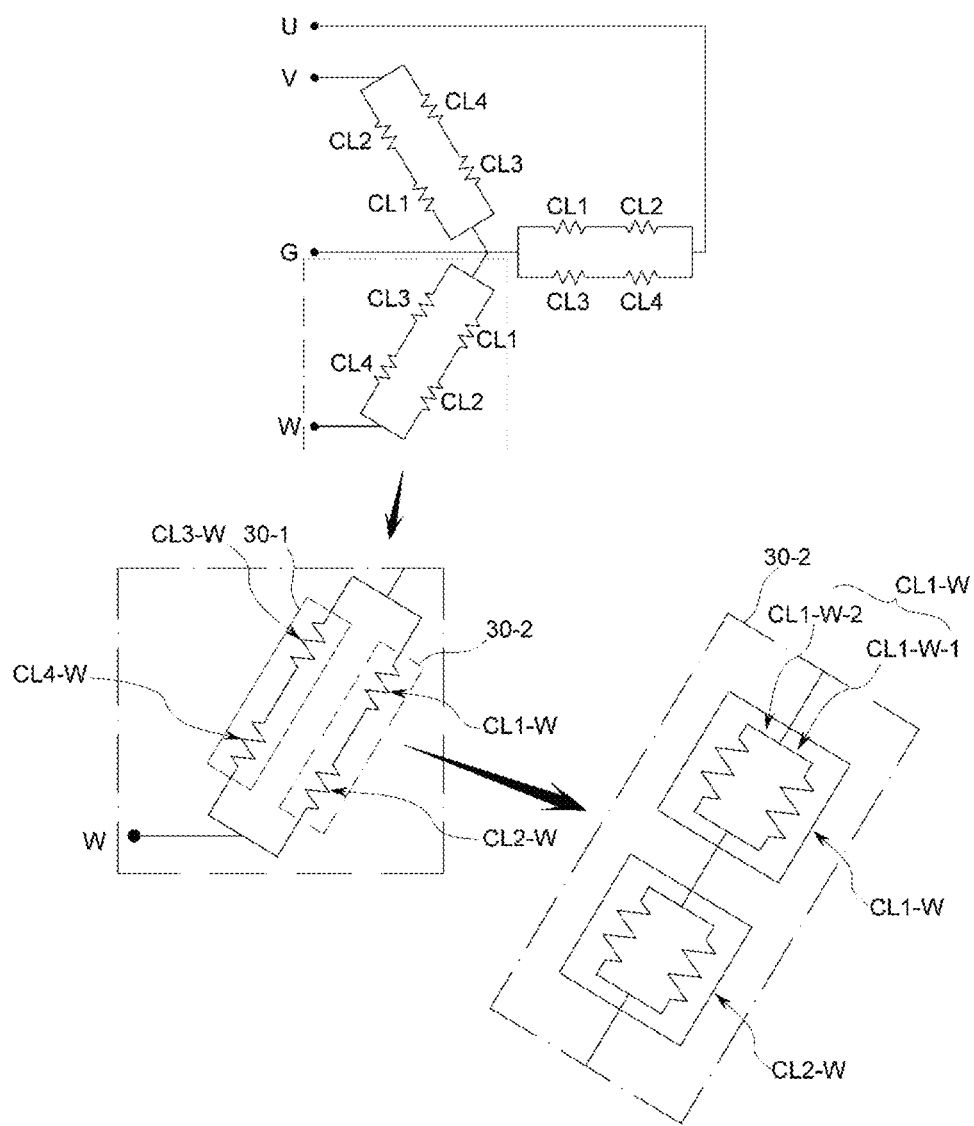
FIG. 10 is a diagram showing another embodiment associated with the electric connection relationship of the coil layers.

FIG. 9 is a diagram showing a structure of a plurality of coil layers CL1, CL2, CL3, CL4 according to the present disclosure, and FIG. 10 is a diagram showing another embodiment associated with the electric connection relationship of the coil layers CL1, CL2, CL3, CL4.

The coil layers CL1, CL2, CL3, CL4 according to the present disclosure may be divided into a plurality of groups connected in parallel with an external power source, and in this case, among the plurality of groups, coil layers belonging to different groups may be connected in series with each other.

For example, as shown in the center region of FIG. 9, the first coil layer CL1 and the third coil layer CL3 may form one group (a first group) connected in parallel with an external power source (negative), and the second coil layer CL2 and the fourth coil layer CL4 may form one group (a second group) connected in parallel with an external power source (positive).

In that state, the first coil layer CL1, which is one of the coil layers CL1, CL3 constituting the first group, is connected in series with one of the coil layers CL2, CL4 constituting the second group, and the third coil layer CL3 of the first group is connected in series with the other of the coil layers CL2, CL4 constituting the second group, which is not connected in series with the first coil layer CL1.

In a corresponding point of view, as shown in the bottom region of FIG. 9, the first coil layer CL1 and the fourth coil layer CL4 may be connected in parallel with an external power source (negative), and the second coil layer CL2 and the third coil layer CL3 may be connected in parallel with an external power source (positive). In this drawing, as an embodiment, the first coil layer CL1 and the second coil layer CL2 are connected in series, and the third coil layer CL3 and the fourth coil layer CL4 are connected in series.

Since the coil layers CL1, CL2, CL3, CL4 at different layers are electrically connected to each other in a combination of parallel and series as above, the magnetic force may be increased and simultaneously the rotational driving may be continued even if disconnection occurs in some power lines.

As described above, the coil units constituting each coil layer CL1, CL2, CL3, CL4 have three different phases (U, V, W).

FIG. 10 is a circuit diagram showing a structure in which coil units by each phase of a specific coil layer are electrically connected to coil units having the same phase in a coil layer different therefrom, and G shown in FIG. 10 refers to a common electrode.

As shown in FIG. 10, among the plurality of coil units constituting each of the coil layers CL1, CL2, CL3, CL4, preferably, the coil units having the same phase form a plurality of groups connected in series with different layers, the plurality of groups are electrically connected to each other in parallel.

Specifically, as shown in the enlarged view at the lower left side of FIG. 10, the coil unit CL3-W corresponding to the W phase among the coil units constituting the third coil layer CL3 and the coil unit CL4-W corresponding to the W phase among the coil units constituting the fourth coil layer CL4 form a third group 30-1.

In a corresponding point of view, the coil unit CL1-W corresponding to the W phase among the coil units constituting the first coil layer CL1 and the coil unit CL2-W corresponding to the W phase among the coil units constituting the second coil layer CL2 form a fourth group 30-2.

That is, the coil units CL3-W, CL4-W forming the third group 30-1 are connected in series, and the coil units CL3-W, CL4-W forming the fourth group 30-2 are also connected in series. In this state, the third group 30-1 and the fourth group 30-2 are connected in parallel.

Since the coil units of each coil layer CL1, CL2, CL3, CL4 are electrically connected to each other through a combination of series and parallel as described above for each phase, it is identically applied to the overall coil layers, and also in each detailed phase (U, V, W), it is possible to enhance magnetic force and improve the ability for coping with disconnection or the like.

It is more preferable to configure each of the coil units to be made of a plurality of individual coils connected in parallel with each other by means of a multiplexing pattern so that the ability to cope with disconnection or the like may be further improved.

For example, as shown in the enlarged view of the lower side of FIG. 10, at least one (preferably all) of the coil units CL1-W, CL2-W constituting the fourth group 30-2 may be made of detailed coil units CL1-W-1, CL1-W-2 connected in parallel by means of two-line patterning during the process of forming coils.

In this configuration, since the coil unit of a specific phase in the corresponding coil layers CL1, CL2, CL3, CL4 is implemented using two coils connected in parallel, as in the embodiment shown in the bottom of the enlarged view of FIG. 10, four layers have a complex electrical connection structure connected in parallel (CL1-W-1 vs. CL1-W-2), in series (CL1-W vs. CL2-W) and in parallel (30-1 vs. 30-2) for each phase.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

In the above description of this specification, the terms such as "first", "second", "upper" and "lower" are merely conceptual terms used to relatively identify components from each other, and thus they should not be interpreted as terms used to denote a particular order, priority or the like.

The drawings for illustrating the present disclosure and its embodiments may be shown in somewhat exaggerated form in order to emphasize or highlight the technical contents of the present disclosure, but it should be understood that various modifications may be made by those skilled in the art in consideration of the above description and the illustrations of the drawings without departing from the scope of the present invention.

What is claimed is:

1. An actuator for generating vibration, comprising:
   a shaft;
   a middle supporter having a fitting portion fitted into an upper portion of the shaft and a support portion provided below the fitting portion to form a first space in which a lower portion of the shaft is exposed;
   a circuit board having a driving coil and a hollow formed through the middle supporter;
   a housing having an inner space formed to accommodate the middle supporter and the circuit board so that the circuit board is fixed thereto;
   a first yoke plate having a first magnet installed to face an upper surface of the driving coil and fixedly coupled to an upper portion of the middle supporter;
   a second yoke plate having a second magnet installed to face a lower surface of the driving coil and fixedly coupled to a lower portion of the middle supporter; and
   a weight installed to at least one of the first and second yoke plates.

2. The actuator for generating vibration according to claim 1, further comprising:
   a second bearing assembly provided in the first space to physically support the lower portion of the shaft exposed in the first space.

3. The actuator for generating vibration according to claim 2, further comprising:
   a first bearing assembly configured to physically support an outer circumference of the fitting portion.

4. The actuator for generating vibration according to claim 2,
   wherein an inner diameter of the first space is greater than an outer diameter of the fitting portion.

5. The actuator for generating vibration according to claim 3,
   wherein the first bearing assembly includes:
   a first body configured to face the outer circumference of the fitting portion; and
   a first ball provided to the first body and configured to contact the outer circumference of the fitting portion,
   wherein the second bearing assembly includes:
   a second body configured to face the lower portion of the shaft; and
   a second ball provided to the second body and configured to contact the lower portion of the shaft.

6. The actuator for generating vibration according to claim 5, wherein the first ball has a greater diameter than the second ball.

7. The actuator for generating vibration according to claim 3,
wherein the housing includes:
an upper housing having a first placing portion provided at an inner upper surface thereof so that the first bearing assembly is coupled thereto;
a sub case having a second placing portion formed at a bottom surface thereof so that the second ball bearing assembly is provided thereto and the first space is coupled thereto, the sub case having at least one coupling portion that is coupled to the circuit board; and
a lower housing having a coupling space to which the sub case is coupled, the lower housing being coupled with the upper housing.

8. The actuator for generating vibration according to claim 5,
wherein a position at which the first ball guides and supports rotational movement of the fitting portion is relatively outer and relatively upper than a position at which the second ball guides and supports rotational movement of the lower portion of the shaft.

* * * * *